(12) United States Patent
Tarbutton et al.

(10) Patent No.: US 9,746,321 B2
(45) Date of Patent: Aug. 29, 2017

(54) OPTICAL DISPLACEMENT SENSING SYSTEM UTILIZING EDGE DIFFRACTION

(71) Applicant: University of South Carolina, Columbia, SC (US)

(72) Inventors: Joshua Tarbutton, Columbia, SC (US); Chabum Lee, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 15/041,466

(22) Filed: Feb. 11, 2016

(65) Prior Publication Data

US 2017/0122729 A1    May 4, 2017

Related U.S. Application Data

(60) Provisional application No. 62/114,777, filed on Feb. 11, 2015.

(51) Int. Cl.
*G01B 11/00*    (2006.01)
*G01B 11/27*    (2006.01)

(52) U.S. Cl.
CPC .................. *G01B 11/272* (2013.01)

(58) Field of Classification Search
CPC ............ G01B 11/272; H01L 21/67092; H01L 21/681; Y10T 29/49131
USPC .................................................. 356/399–401
See application file for complete search history.

(56) References Cited

U.S. PATENT DOCUMENTS

| | | | | |
|---|---|---|---|---|
| 5,877,845 A | * | 3/1999 | Makinouchi | G03F 7/70358 250/548 |
| 6,091,075 A | * | 7/2000 | Shibata | G01N 21/9501 250/559.44 |
| 6,473,160 B2 | * | 10/2002 | Suzuki | G03F 7/7005 355/53 |
| 6,842,248 B1 | * | 1/2005 | Binnard | G03F 7/70775 355/53 |
| 7,545,480 B2 | * | 6/2009 | Lee | G03F 9/7003 355/53 |
| 2004/0021866 A1 | * | 2/2004 | Watts | B29C 35/0888 356/401 |
| 2007/0252994 A1 | * | 11/2007 | Bijnen | H01L 21/67092 356/401 |

OTHER PUBLICATIONS

Arnaud, et al.; "Technique for Fast Measurement of Gaussian laser Beam Parameters," *Applied Optics*, (Dec. 1971) vol. 10, No. 12, (2 pages).

(Continued)

*Primary Examiner* — Tarifur Chowdhury
*Assistant Examiner* — Isiaka Akanbi
(74) *Attorney, Agent, or Firm* — Dority & Manning, P.A.

(57) ABSTRACT

Methods are provided for determining the position of a substrate. The edge diffraction model suitable for the proposed measurement apparatus was mathematically derived, and the effect of the parameters associated with the edge diffraction was investigated. In addition, the fundamental limits are discussed about the linearity and resolution of the sensor by estimating the effects of edge roughness and sharpness of the knife edge on the knife edge diffraction of an incident wave based on Kirchhoff approximation.

17 Claims, 17 Drawing Sheets

(56) References Cited

OTHER PUBLICATIONS

Bazaei, et al.; "Displacement Sensing With Silicon Flexures in MEMS Nanopositioners," *Jnl. Microelectromechanical Sys.*, (Jun. 2014) vol. 23, No. 3, (3 pages).
Bennett, et al.; "Relation Between Surface Roughness and Specular Reflectance at Normal Incidence," *H.E. Bennett and J.O. Porteus*, (Feb. 1961) vol. 51 (16 pages).
Born, et al.; "Principles of Optics: Electromagnetic Theory of Propagation, Interference, and Diffraction of Light," *Pergamon Press*, New York, 6th Ed, 1980. [Book—no available .pdf].
Choi, "Development of long stroke nano-stage for scanning probe microscope," *MS Thesis, Gwangju Institute of Science and Technology*, 1999.
Collin; "Antennas and Radiowave Propagation," *New York: McGraw-Hill*, 1985, [Book—no available .pdf].
Davis, et al.; "Diffraction by a randomly rough knife edge," *IEEE Trans. Antennas Propag.*, vol. 50, No. 12, 2002.
Gao; Precision Nanometrology: Sensors and Measuring Systems for Nanomanufacturing, *Springers*, 2010 [Book—no available .pdf].
Giovaneli, "An analysis of simplified solution for multiple knife-edge diffraction," *IEEE Trans. Antennas Propag.*, vol. 32, No. 3, pp. 297-301, 1984.
Hecht; Optics 4th Ed., *Addison-Wesley Longman Inc.*, 1987. [Book—no available .pdf].
Howell; "Compliant Mechanisms," *John Wiley & Sons, Inc.*, New York, NY, 2001 [Book—no available .pdf].
Ishimaru; "Wavepropagation and Scattering in Random Media," Piscataway, NJ:IEE, 1997 [Book—no available .pdf].
Joo, et al.; "Real-time wavelength corrected heterodyne laser interferometry," *Precision Engineering*, (2011) 35, pp. 38-43.
Kim, et al.; "Influence of a high vacuum on the precise positioning using an ultrasonic linear motor," *Review of Scientific Instruments* (2011) 82, 015112-1 (11 pages).
Kimura, et al.; "Design and construction of a surface encoder with dual sine-grid," *Int. J. Precis. Eng. Manuf.*, vol. 8, pp. 20-25, 2007 [Abstract only].
Lee, et al.; "Design and construction of a single unit multi-function optical encoder for a six-degree-of-freedom motion error measurement in an ultraprecision linear stage," *Meas. Sci. Technol.*, (2011) 22, 105901 (10 pages).
Lee, et al.; "Multi-degree-of-freedom motion error measurement in an ultraprecision machine using laser encoder—Review," *Journal of Mechanical Science and Technology*, (2013) 27 (1), pp. 141-152.
Lee, et al., "Uncertainty investigation of grating interferometry in six degree-of-freedom motion error measurement," *Int J. Precis. Eng. Manuf.*, (2012) vol. 13, No. 9, pp. 1509-1515.
Parmar, et al.; "Large dynamic range nanopositioning using iterative learning control," *Precision Engineering*, (2014) 38, pp. 48-56.
Saito, et al.; "Investigation of an optical sensor for small tilt angle detection of a precision linear stage," *Meas. Sci. Technol.*, (2010) 21, 054006 (7 pages).
Slocum; "Precision ecision machine design," *Boekbespreking: Mikroniek* (1993) No. 5, pp. 138-139.
Smith; "Flexures: Elements of Elastic Mechanisms," *Taylor & Francis*, London, England, 2002 [Book—no available .pdf].
Song, et al.; "Design and Performance Analysis of Laser Displacement Sensor Based on Position Sensitive Detector (PSD)," *Jnl. Phys: Conf. Series*, (2006) 48, pp. 217-222.
Suganuma, et al.; "Development of a Differential Optical Fiber Displacement Sensor," *Jnl. Magnetics Soc. Japan*, (1997) 21, Suppl. No. S2 (4 pages).
Tang, et al.; "Laterally Driven Polysilicon Resonant Microstructures," *Sensors and Actuators*, (1989) 20, pp. 25-32.
Yong, et al.; "Novel Piezoelectric Strain Sensor for Simultaneous Damping and Tracking Control of a High-Speed Nanopositioner," *IEEE/ASME Transactions on Mechatronics*, (Jun. 2013) vol. 18, No. 3, (9 pages).

\* cited by examiner

OPTICAL DISPLACEMENT SENSING SYSTEM UTILIZING EDGE DIFFRACTION

PRIORITY INFORMATION

The present application claims priority to U.S. Provisional Patent Application Ser. No. 62/114,777 titled "Optical Displacement Sensing System Utilizing Edge Diffraction" of Tarbutton, et al. filed on Feb. 11, 2015, the disclosure of which is incorporated by reference herein.

BACKGROUND

High precision stages have been extensively used in many machining and manufacturing facilities such as semiconductor processing, machine tool metrology and assembly line testing because those stages typically have high positioning accuracy with a large dynamic range and a wide bandwidth. Here, the displacement sensing technology plays a key role for the fast and robust positioning control and high resolution measurement. Displacement is one of the most fundamental quantities for precision stage applications. Noncontact sensors such as capacitive displacement sensor and optical sensor, laser interferometer, laser encoder and position sensitive detector (PSD), have been commonly used in high precision stage applications because those are acceptable for dynamic motion characterization and fast and high resolution measurement. However, up to recently, the capacitive displacement sensor and PSD have been more preferred to the laser interferometer and laser encoder because they are so compact that they can be easily embedded into the stage.

In a current displacement measurement technology for precision stage applications, the capacitive type sensors have been mostly widely used because these can detect motion at sub-nanometer levels directly and provide accuracy, linearity, resolution, and stability. But the target must be conductive, and attractive force between the target and the sensor probe should be canceled. Unfortunately, they are relatively expensive. On the other hand, PSDs are commonly used because these are cheap and capable of measuring lateral displacement in one or two dimensions. They consist of two, four or more segmented photodiodes positioned symmetrically around the center of the detector and separated by a narrow gap and anode and common cathode contacts as seen in FIG. 1. The position information is derived from the optical signal powers received by the segmented each photodiode and defined by the relative position of the beam spot with respect to the center of the devices. However, many issues about the position accuracy and resolution have been raised due to the gap size between the elements, incident light intensity uniformity and aberration, the optical alignment and the doping uniformity of the each active area. Moreover, the sensitivity issue of PSD is crucial. It is well-known that the smaller the beam spot size, the higher the sensitivity. It is thus effective to make the beam spot small as possible to improve the sensor sensitivity. However, the minimum beam spot size is limited because the gaps exist between each photodiode, which are not sensitive to the beam spot.

Many works on the nanometer resolution displacement sensing instrumentation that can be implemented to high precision stages have been performed since a few decades ago. The companies, Physik Instrumente, Lion Precision and InSitu Tec, have been using the capacitive sensors to be integrated with flexure stages, and achieved sub-nanometer resolution. Tang first introduced the lateral comb drive in an electrostatic resonator, and has since been used numerous times in both actuator and sensing configurations. Yong presented a novel piezoelectric strain sensor for a high speed nanopositioning stage, and Bazaei reported a novel piezoresistive sensor embedded with micro-electromechanical system-based (MEMS) nanopositioner. Zhu introduced an electrothermal position sensor consisted of two beam-shaped resistive heaters made from single crystal silicon for a micromachined nanopositioner. Parmar used a laser encoder to test the tracking performance for a large range single-axis nanopositioning system based on a moving magnetic actuator and a flexure stage. Lee reported a PSD-based multi-axis displacement measurement sensor for nanopositioning stage and Gao introduced a high sensitivity optical displacement sensor based on single photodiode. However, simple, cheap, noncontact and high resolution sensor that can be easily embedded into a high precision stage has not been well-documented.

SUMMARY Objects and advantages of the invention will be set forth in part in the following description, or may be obvious from the description, or may be learned through practice of the invention.

Methods are generally provided for determining the position of a substrate. In one embodiment, the method includes attaching a first beam blocking component and a second beam blocking component onto the substrate; passing a first light laser beam incident to the first beam blocking component and into a first photodetector such that first beam blocking component intersects the first laser beam to create a blocked portion of the first laser beam and a first diffracted light portion extending past the first beam blocking component and into the first photodetector; passing a second light laser beam incident to the second beam blocking component and into a second photodetector such that the second beam blocking component intersects the second laser beam to create a blocked portion of the second laser beam and a second diffracted light portion extending past the second beam blocking component and into the second photodetector; determining a position of the substrate using signals received by at the first photodetector and the second photodetector; and repositioning the substrate based on the position determined.

In one embodiment, the position of the substrate determined using signals received by at the first photodetector and the second photodetector is performed real-time, as well as the repositioning the substrate based on the position determined. For example, the position of the substrate determined using signals received by at the first photodetector and the second photodetector can be performed real-time while the substrate is moving, as well as the repositioning the substrate based on the position determined while the substrate is moving.

In a particular embodiment, the first beam blocking component intersects the first laser beam to bisect the first laser beam into a first direct transverse portion and the first diffracted portion extending past the first beam blocking component and into the first photodetector. As such, the first direct transverse portion and the first diffracted portion can be superposed to lead to interference at the first photodetector. Similarly, the second beam blocking component can intersect the second laser beam to bisect the second laser beam into a second direct transverse portion and the second diffracted portion extending past the second beam blocking component and into the second photodetector. As such, the second direct transverse portion and the second diffracted portion can be superposed to lead to interference at the second photodetector.

The first beam blocking component can be a knife edge extending in a first direction, and the second beam blocking component can be a knife edge extending in a second direction. In one embodiment, the first direction is 180° from the second direction such that the first knife edge and the second knife edge extend in a plane. The first direction and the second direction are generally parallel to a direction of travel of the substrate, in particular embodiments.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DETAILED DESCRIPTION

Figure 1:
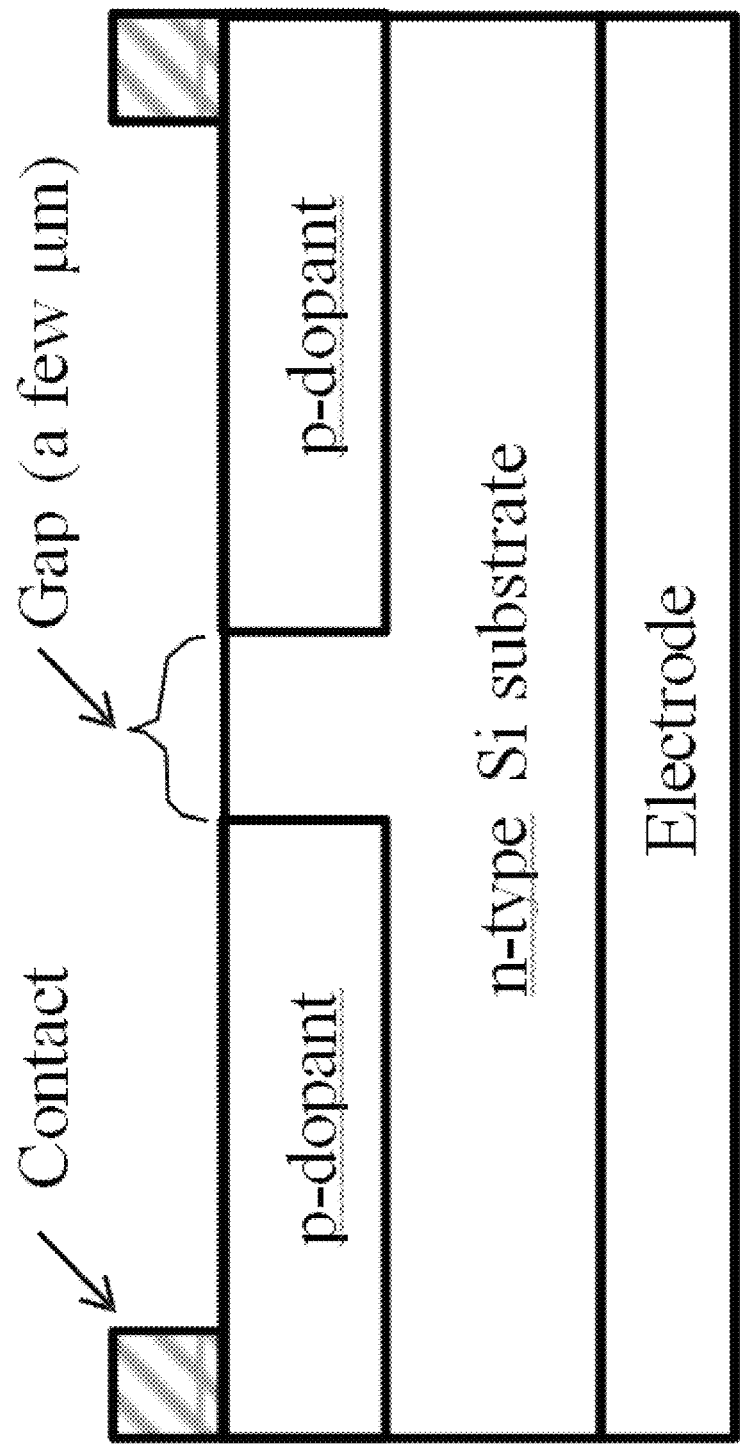
FIG. 1 shows a schematic cross-sectional view of one-dimensional PSD that includes two photodiode elements with contacts, electrode and gap.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A simple and economic high resolution knife edge-based displacement sensor is generally provided, which is particularly useful for machine tool metrology. The edge diffraction model suitable for the proposed measurement apparatus was mathematically derived, and the effect of the parameters associated with the edge diffraction was investigated. In addition, the fundamental limits are discussed about the linearity and resolution of the sensor by estimating the effects of edge roughness and sharpness of the knife edge on the knife edge diffraction of an incident wave based on Kirchhoff approximation.

In one embodiment, an optical sensor is generally provided utilizing the edge diffraction that can be implemented in a precision stage. The optical sensor allows for a simple and non-contact sensing configuration and provides a high resolution. Two knife edges are mounted on the precision stage parallel to the traveling direction and two photodetectors are placed behind the knife edges, respectively. Two separated laser beams are incident into the knife edges, and the direct transverse and diffracted lights are superposed and lead to interference, which is measured at two photodetectors in a differential amplifier configuration and converted into real-time displacement while the stage is in motion.

Although described with respect to a knife edge, any suitable beam blocking component can be utilized instead, such as pinholes, slits, arbitrary apertures, flanges, etc.

EXAMPLES

The performance of the proposed sensor was compared to the measurement results of the laser interferometer and two-segmented one-dimensional position sensitive detector. As a result, the proposed sensor showed a high linearity within 60 μm range and the resolution 5.2 nm. In addition, the fundamental limits were investigated about the sensitivity of the sensor by estimating the effects of knife edge quality, edge roughness and sharpness, on the edge diffraction of an incident wave to the knife edge based on Kirchhoff approximation.

Edge Diffraction:

In electromagnetic wave propagation, the knife edge diffraction is a redirection by diffraction of a portion of incident waves that strikes a well-defined obstacle such as the edge of building, pipe or blade. That effect is explained by Huygens-Fresnel principle, which states that each point on a wavefront acts as a source of secondary wavelets. And combination of these secondary wavelets produces the new wavefront in the direction of propagation, which can propagates into the geometric shadow area of the obstacle. The knife edge techniques are commonly used for optical beam profiling of laser beam.

Figure 2:
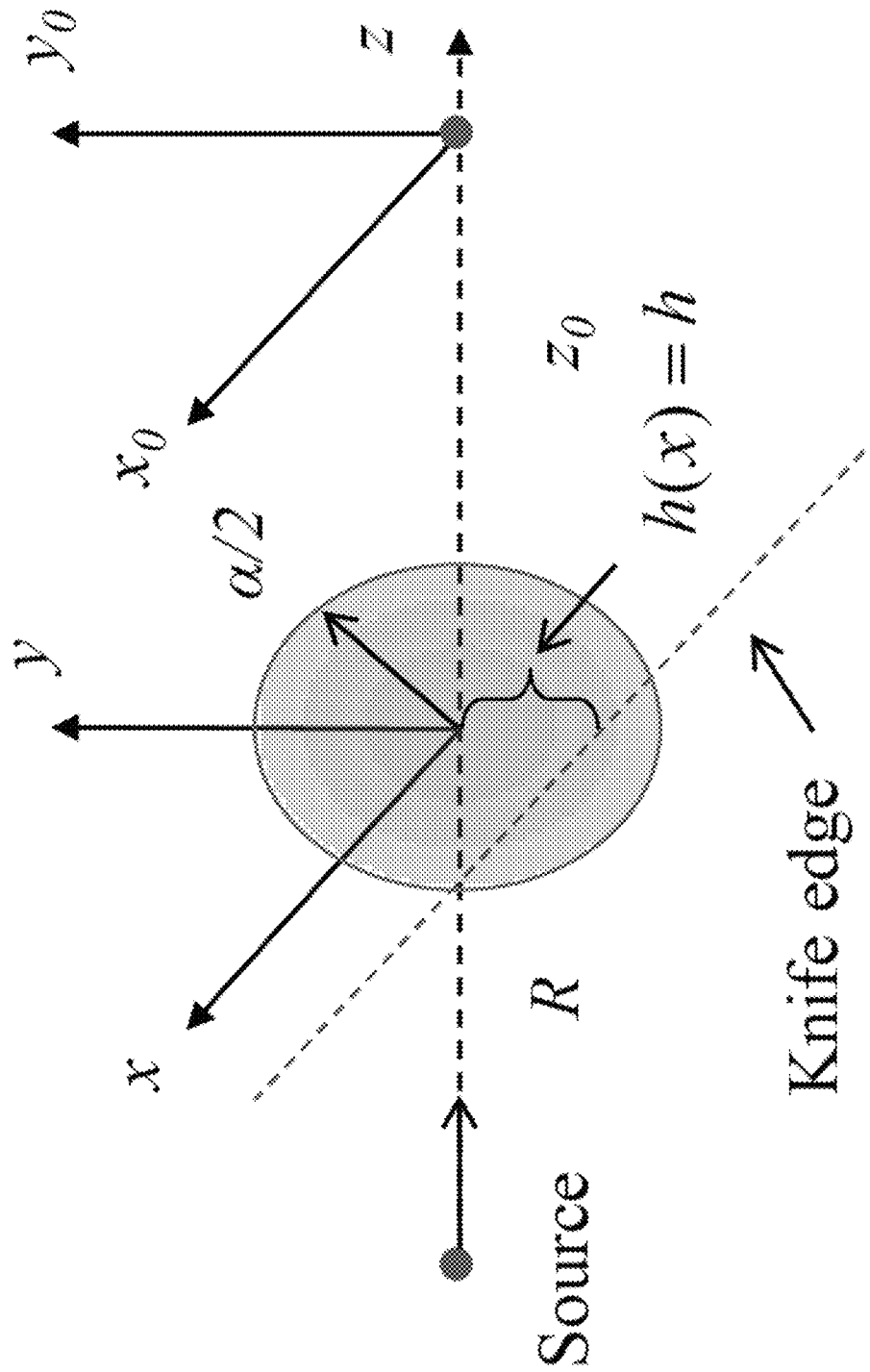
FIG. 2 shows a schematic illustration of the knife edge diffraction in case of the smooth and sharp edge.

Assuming that the total field above the knife edge is simply the incident field and the light source transverses along the z axis as seen in FIG. 2, the diffracted light to produce results for the edge diffraction can be mathematically defined. A Gaussian beam with a beam width $\alpha$ is assumed to be incident on the knife edge from a light source placed a distance R from the knife edge. The height h is the displacement from the center of the incident beam to the knife edge along the y axis. The distance $z_o$ indicates the distance from the knife edge to the detector along the z axis. Accounting for the spherical and Fresnel phase effect, the incident field (E) at z=0 can be defined as, $$\vec{E}(x, y, z = 0) = \frac{E_0(\hat{x} + \hat{y})e^{-jk_0 R}}{R} e^{-jk_0 \frac{x^2+y^2}{2R}} e^{-\frac{x^2+y^2}{a^2}} \quad (1)$$

The first and second terms are an expression of the incident spherical wave and the last term is for an aperture of the field.

Figure 3A:
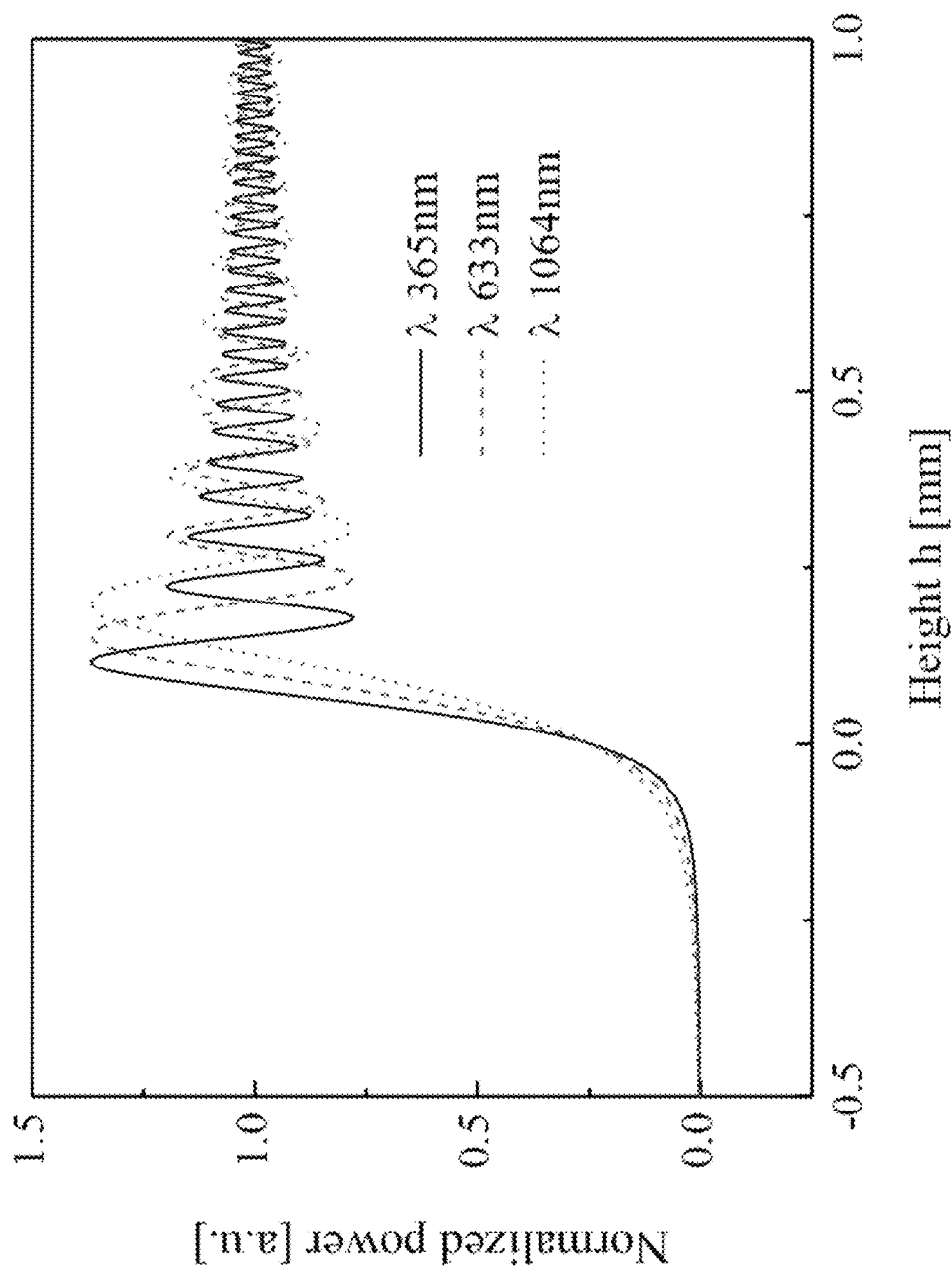
FIG. 3a shows the power curves of the diffracted field calculated with respect to the height under given parameter condition: λ, according to the Examples.
Figure 3B:
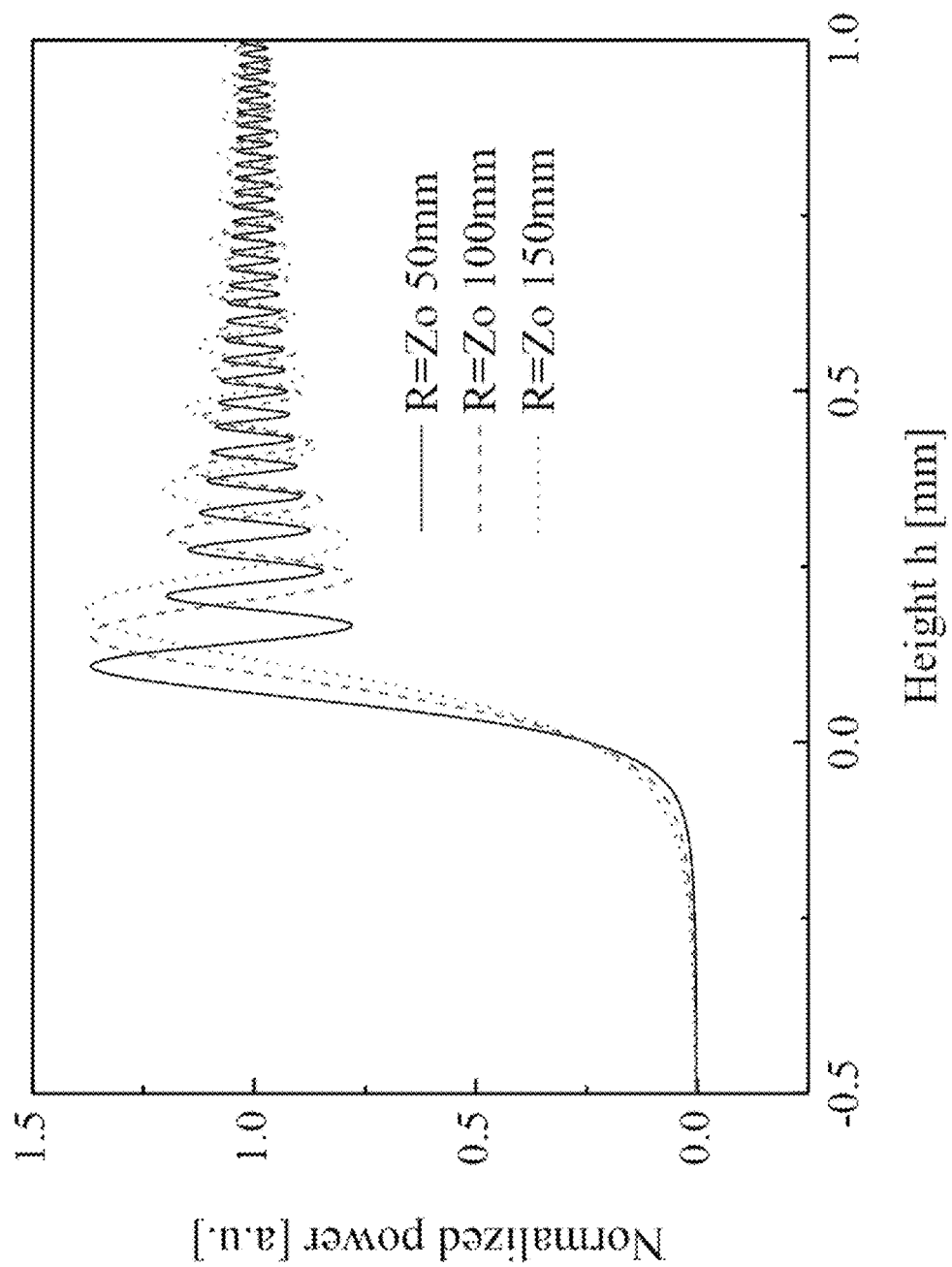
FIG. 3b shows the power curves of the diffracted field calculated with respect to the height under given parameter condition: R and $Z_o$, according to the Examples.
Figure 3C:
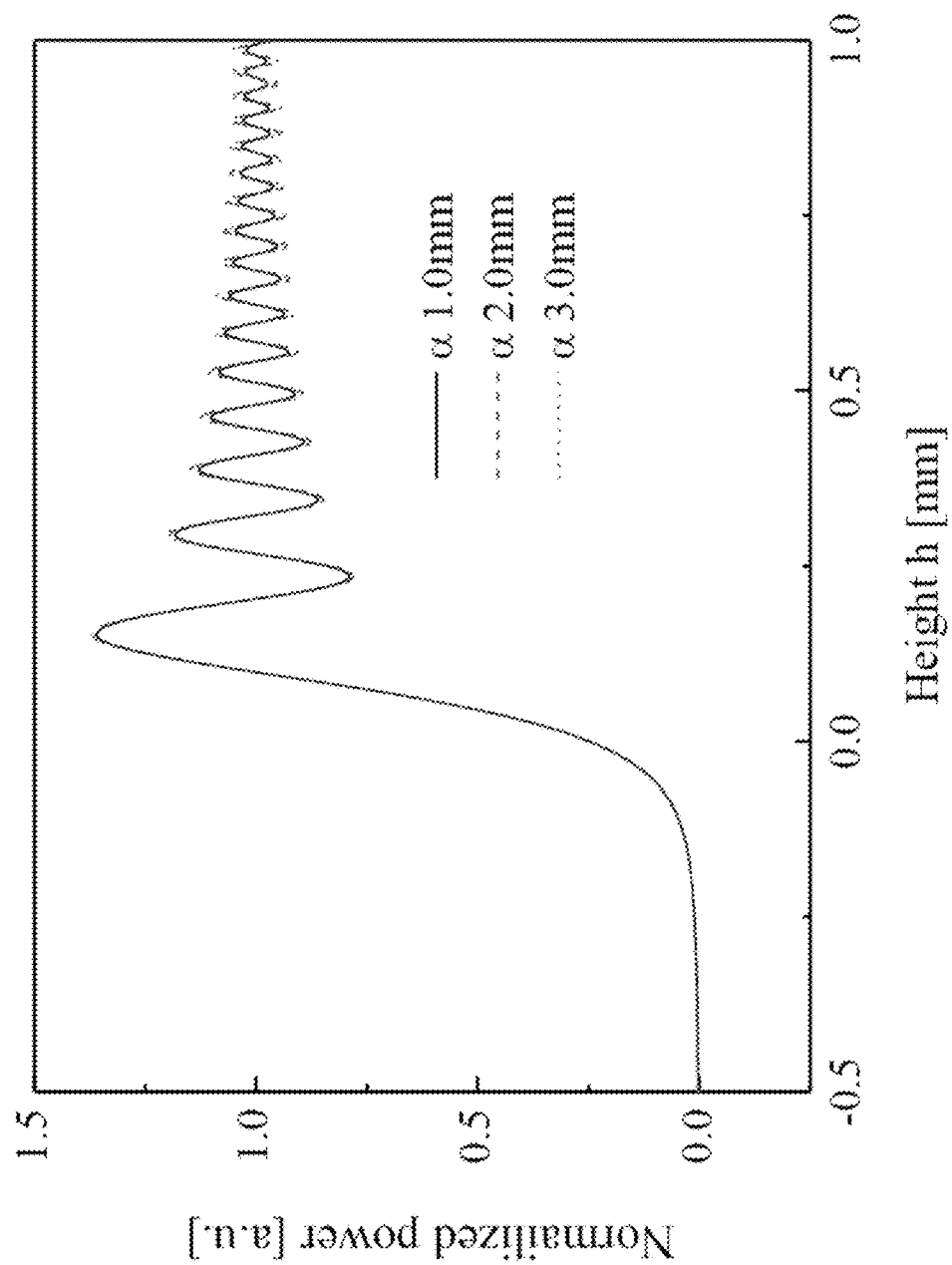
FIG. 3c shows the power curves of the diffracted field calculated with respect to the height under given parameter condition α, according to the Examples.

Assuming that the detector size is so small that the field of interest will be measured near the z axis, that is, the field measurements are performed on the axis ($x_0$=0, $y_0$=0, $z_0$>0), the diffracted field to be measured along the z axis can be defined from the inverse Fourier transform relation of the incident field and written in an error function form as, $$\vec{E}(0, 0, z_0) = \frac{jk_0 e^{-jk(z_0+R)}}{2\pi R z_0}(E_x \vec{x} + E_y \vec{y}) \int_{-\infty}^{\infty} \int_{-h}^{\infty} e^{-a(x^2+y^2)} dy dx \quad (2)$$

$$= \frac{jk_0 e^{-jk(z_0+R)}}{2\pi R z_0}(E_x \vec{x} + E_y \vec{y}) \sqrt{\frac{\pi}{a}} \int_{-h}^{\infty} e^{-ay^2} dy$$

$$= \frac{jk_0 e^{-jk(z_0+R)}}{4\pi R z_0}(E_x \vec{x} + E_y \vec{y})\operatorname{erfc}(-h\sqrt{a}),$$

$$a = \frac{1}{\alpha^2} + jk_o\left(\frac{1}{2R} + \frac{1}{2z_o}\right).$$

where, the electric field diffraction pattern, the wavenumber and the distance vector from the incident to the diffracted field, $$\vec{E} = E_x \vec{x} + E_y \vec{y} + E_z \vec{z}, \vec{k} = k_x \vec{x} + k_y \vec{y} + k_z \vec{z}, k_0^2 = k_x^2 + k_y^2 + k_z^2,$$
$$\vec{r} = x_0 \vec{x} + y_0 \vec{y} + z_0 \vec{z},$$

are expressed, respectively. The erfc is the complementary error function of a complex argument, and a new parameter $\alpha$ as a function of beam width, distance R from the light source to the knife edge and distance zo from the knife edge to the detector, was introduced. Thus, the total diffracted power induced by the knife edge can be calculated by multiplying the diffracted field and the conjugated diffracted field. The effects of the wavelength of the light, distance R and $z_o$ and beam width of the knife edge on the knife edge diffraction with respect to the height were investigated as seen in FIG. 3. It was assumed that the knife edge is placed at the center between the laser and the detector for a simple calculation, and its surface is sharp and smooth. Three sets of knife edge parameters were selected: wavelength (ultraviolet 365 nm/visible 633 nm/infrared 1064 nm), distance R and $z_o$ (50 mm/100 mm/150 mm) and beam width (1.0 mm/2.0 mm/3.0 mm). As a result, it was found that the effect of the edge diffraction becomes more sensitive as the wavelength and distance R and $z_o$ are shorter, and the beam width rarely affects to the result. Thus, the knife edge-based displacement sensor is required to use the short wavelength and make the measurement setup compact to achieve a high sensitivity.

Figure 4A:
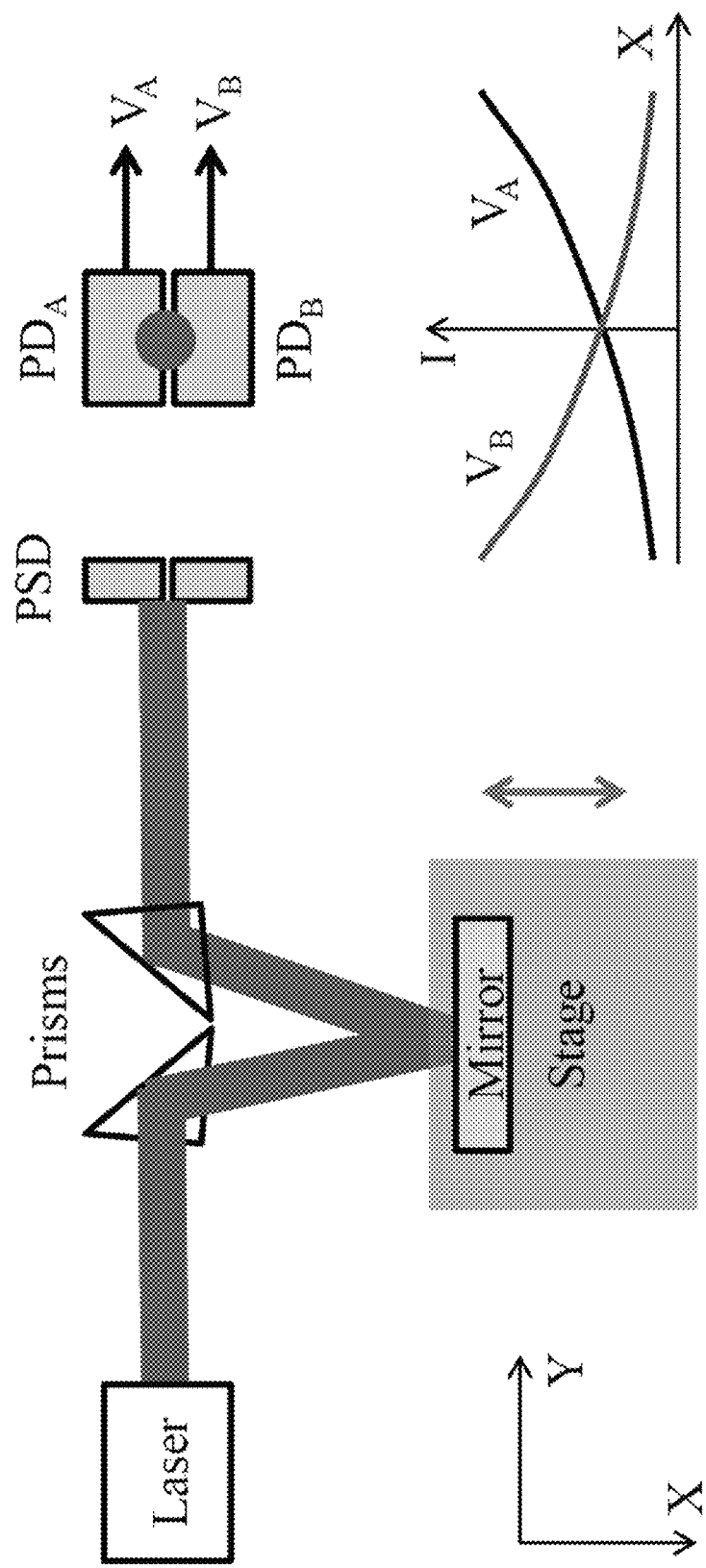
FIG. 4a shows the concept of displacement measurement systems of a PSD-based system according to the Examples.
Figure 4B:
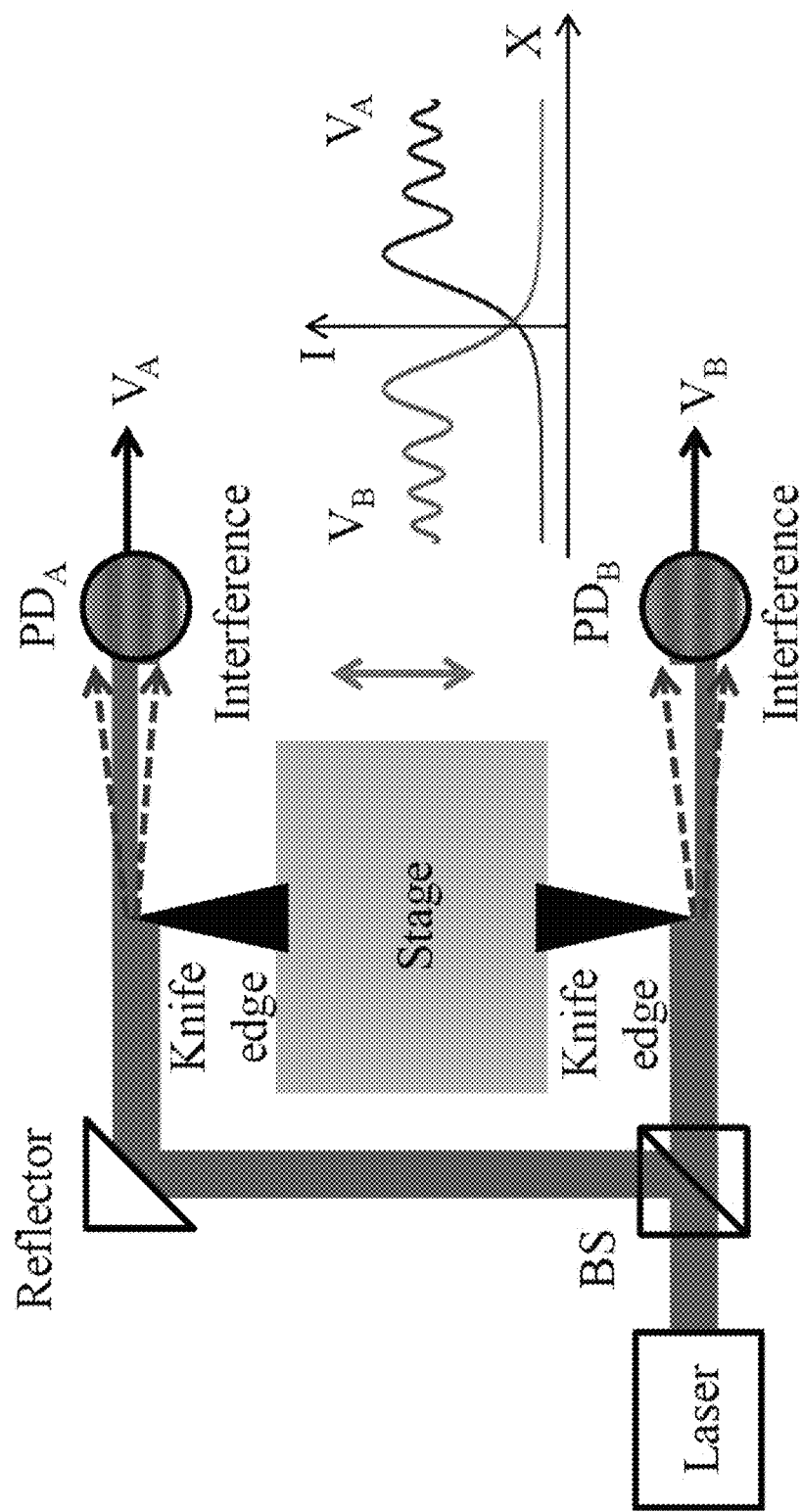
FIG. 4b shows the concept of displacement measurement systems of a edge diffraction-based system according to the Examples.

Measurement Method:

The overall measurement principle of the proposed sensor is similar to that of PSD except for utilizing the interference of the diffracted light from the knifed edge as a displacement signal as seen in FIG. 3. In the PSD-based precision stage applications (FIG. 4(a)), the laser light as a light source is incident into stage and reflected off the mirror mounted on the stage. A pair of prism is often used to mechanically amplify the optical displacement while the stage is in motion along the principle direction. Each photodiode of PSD generates the electric signal based on beam spot position of geometrically-defined light and the physical quantity, displacement, can be obtained by use of a differential amplifier configuration. On the other hand, the proposed measurement system utilizes the interference. As seen in FIG. 4(b), the laser light is separated into two at a beam splitter (BS) and the transmitted and reflected lights are incident into two knife edges mounted on the stage parallel to the traveling direction, respectively. The interference occurs between the partially transverse light and the diffracted light from the knife edge, and it is measured at each photodiode behind the knife edge using a differential amplification signal processing technique. This measurement method is considered to achieve the high resolution and sensitivity of the sensor because the interference is highly sensitive to the displacement of the knife edge. Moreover, it can enhance the sensitivity and get rid of crosstalk of the sensor because it provides a gap-free application that a PSD-based measurement system cannot achieve, which has been raised as issues since many years ago.

Figure 5:
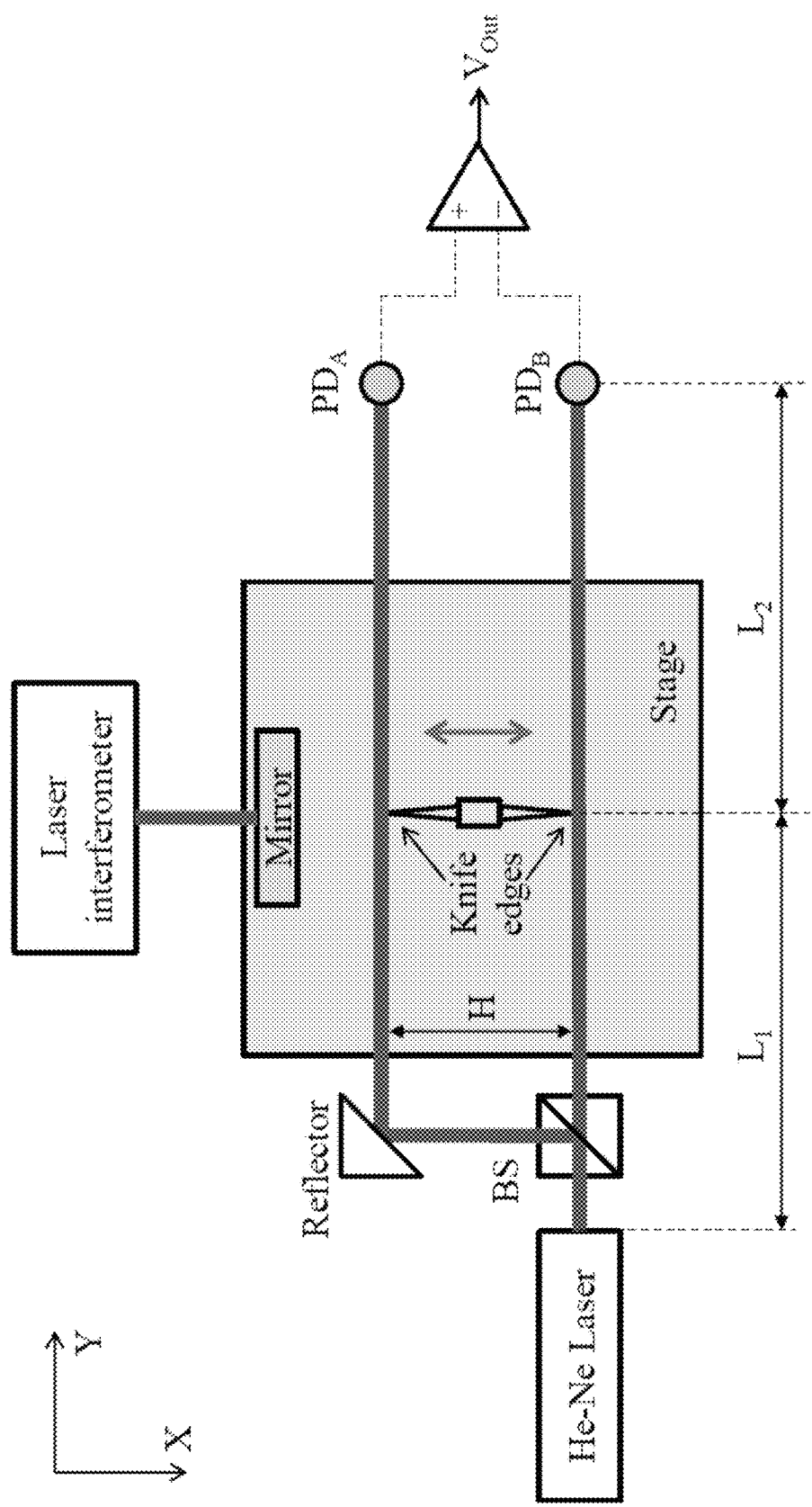
FIG. 5 shows a schematic illustration of the proposed displacement measurement setup according to the Examples.

Experiment:

In the work, a lab-built PZT-driven flexure stage for a scanning probe microscopy application was used. The stage is based on the elastic hinge structure and the lever principle to make the displacement magnify up to a stroke of 30 µm, and a single PZT actuator is placed along the driving X-axis and two PZT actuators are placed on the Y-axis to compensate the yaw motion and four PZT actuators are used for compensation of the pitch motion. The experiment setup was illustrated in FIG. 5. A stabilized He—Ne laser ($\lambda$ 633 nm) as a coherent light source was used. The laser beam is separated 50:50 at BS. A transverse beam and reflected beam are incident onto the knife edges fixed on the stage, respectively, and a small fraction of light is diffracted at the knife edge. A transverse beam and diffracted beam experience the interference due to phase matching and mismatching, and those signals are measured at each photodetector (PDA and PDB) in a differential amplifier configuration and collected with a LabView data acquisition board under the ambient environment condition. The electronic circuit consisted of current-to-voltage converter, adder, subtractor and divider to extract the displacement information in a differential configuration, and the instrumentation amplifier and low pass filter were added at the end of the circuit to maximize the sensitivity of the sensor and minimize the noise, respectively. The distance $L_1$ between the laser and the knife edge and the distance $L_2$ between the knife edge and photodetector are set to 100 mm, equally, and the beam width is 2.0 mm. The laser interferometer was used to measure the displacement of the stage and compare this result with that of the proposed edge diffraction sensor. Also, one-dimensional PSD was placed on the stage for comparison.

Figure 6:
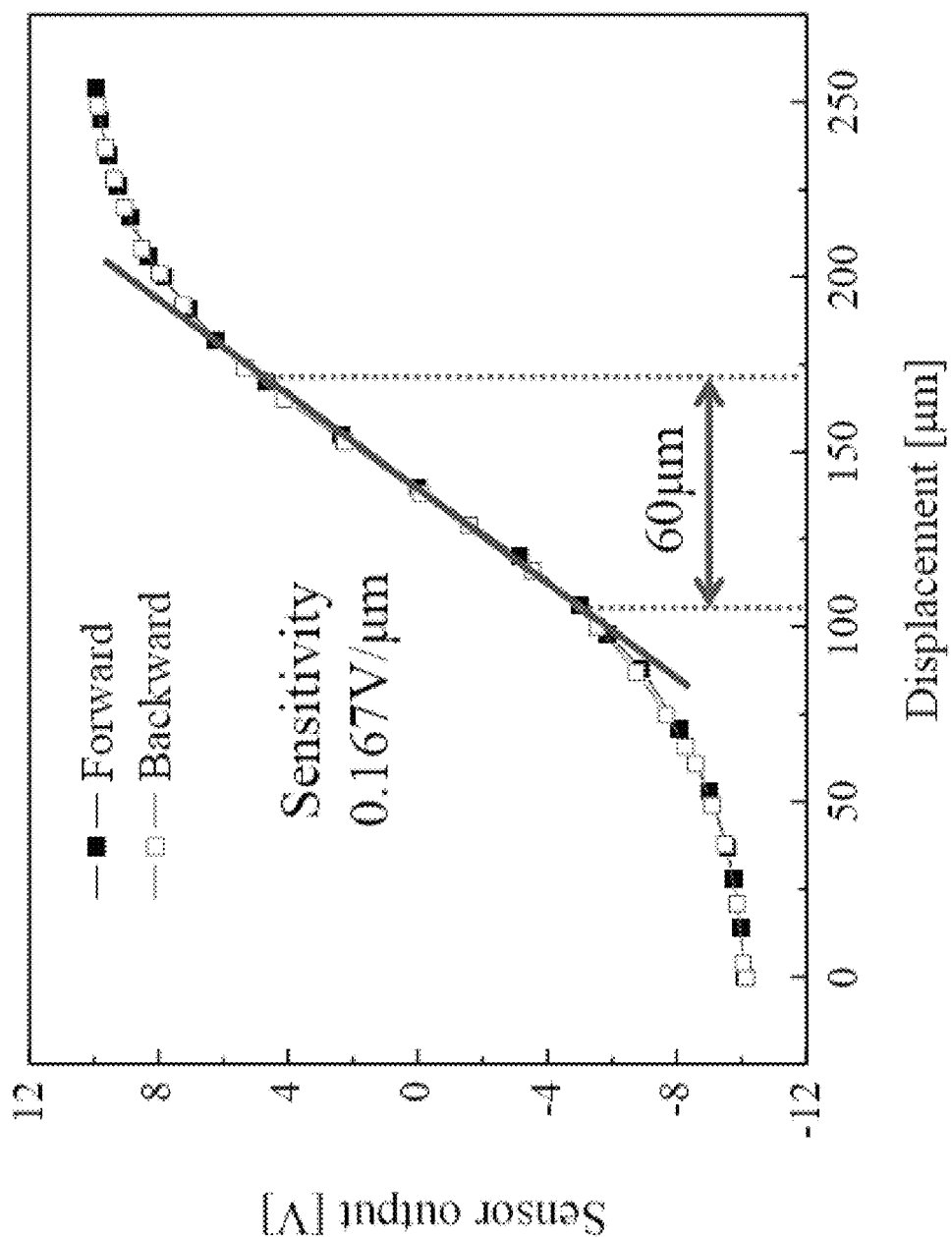
FIG. 6 shows a calibration result of the proposed sensor according to the Examples.
Figure 7A:
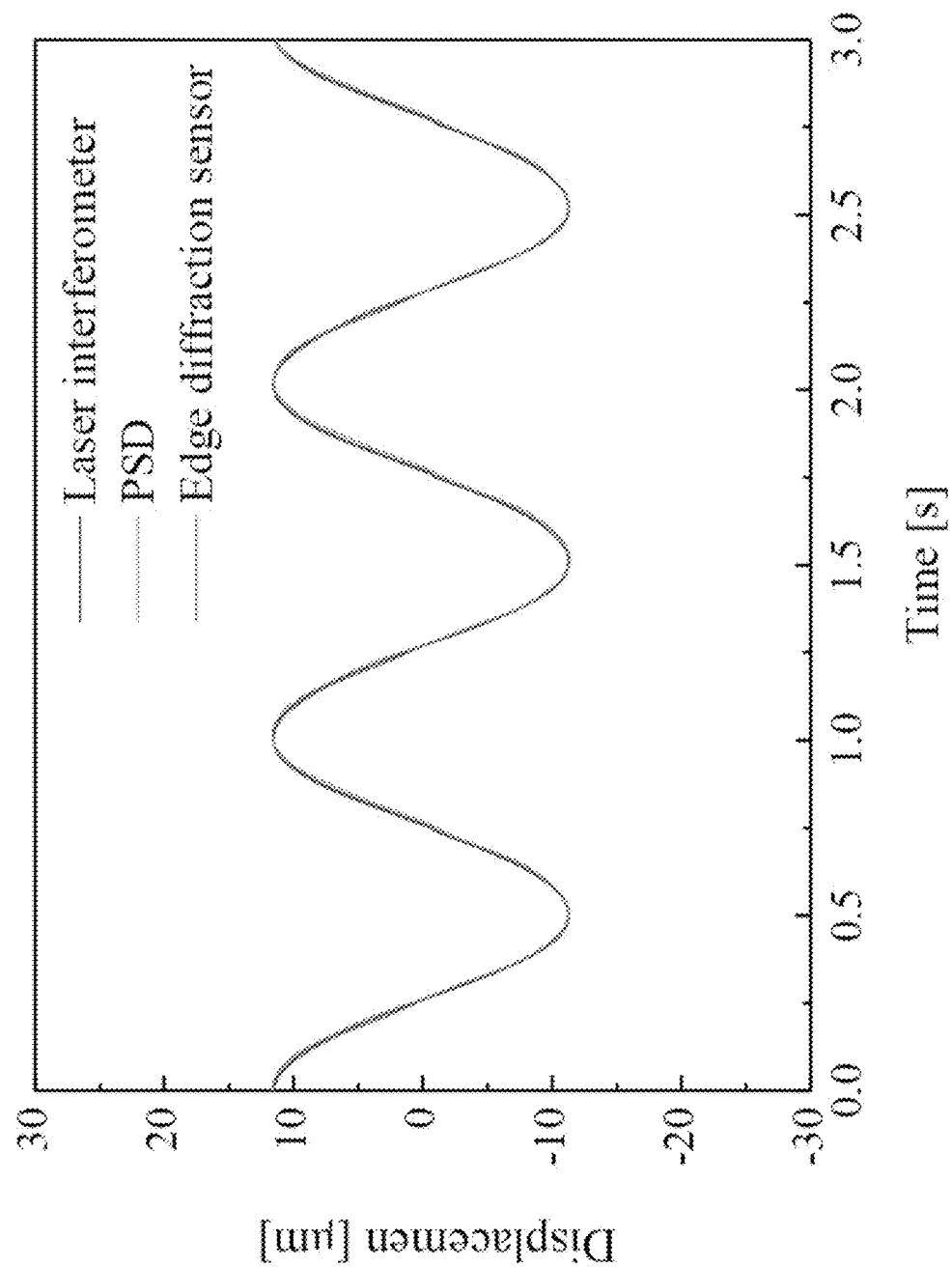
FIGS. 7a, 7b, 7c, and 7d show measurement results under stroke of 25 μm (FIG. 7a), 6 μm (FIG. 7b), 0.3 μm (FIG. 7c) and 0.03 μm (FIG. 7d) conditions and comparison to the measurement results of the laser interferometer and PSD according to the Examples.
Figure 7B:
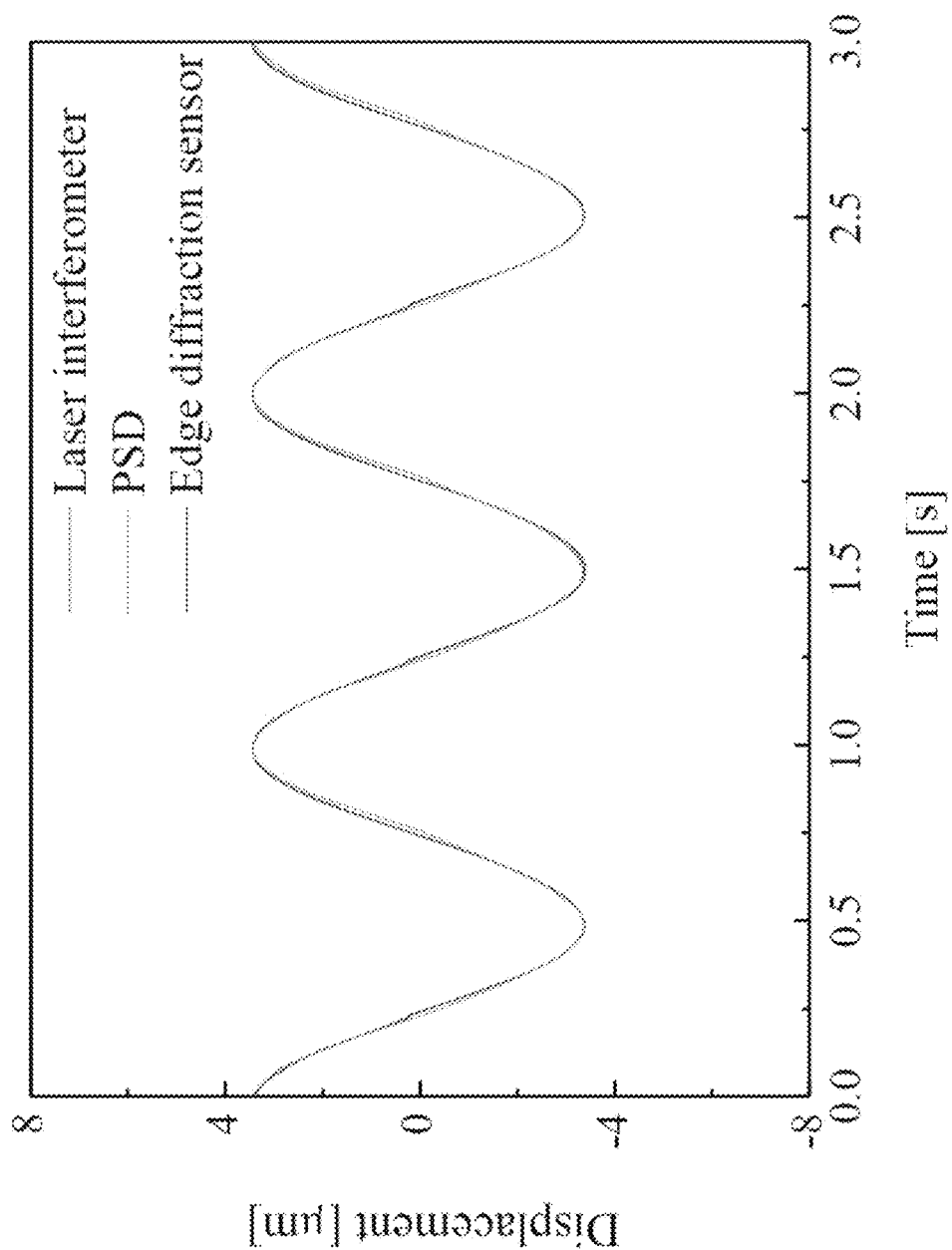
Figure 7C:
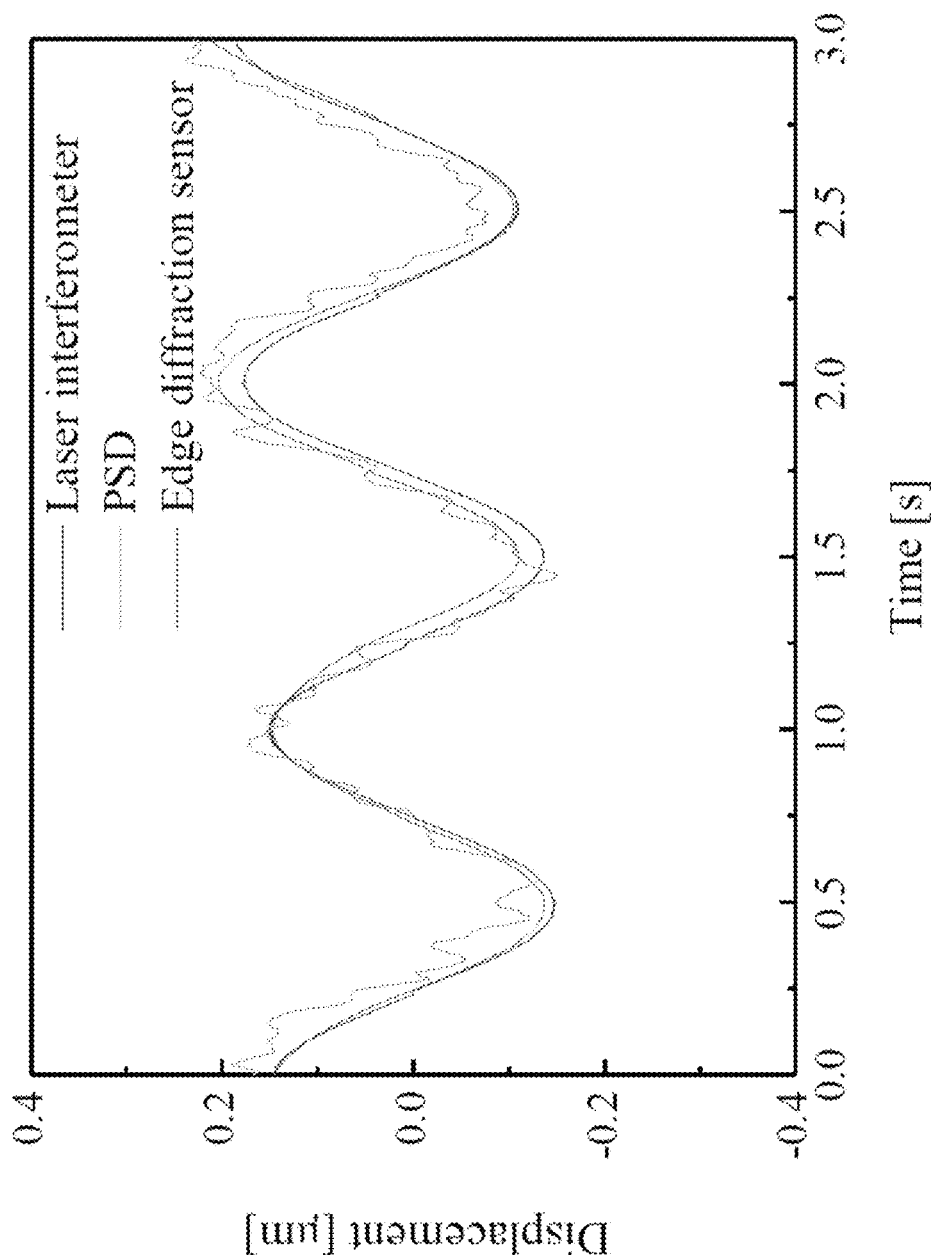
Figure 7D:
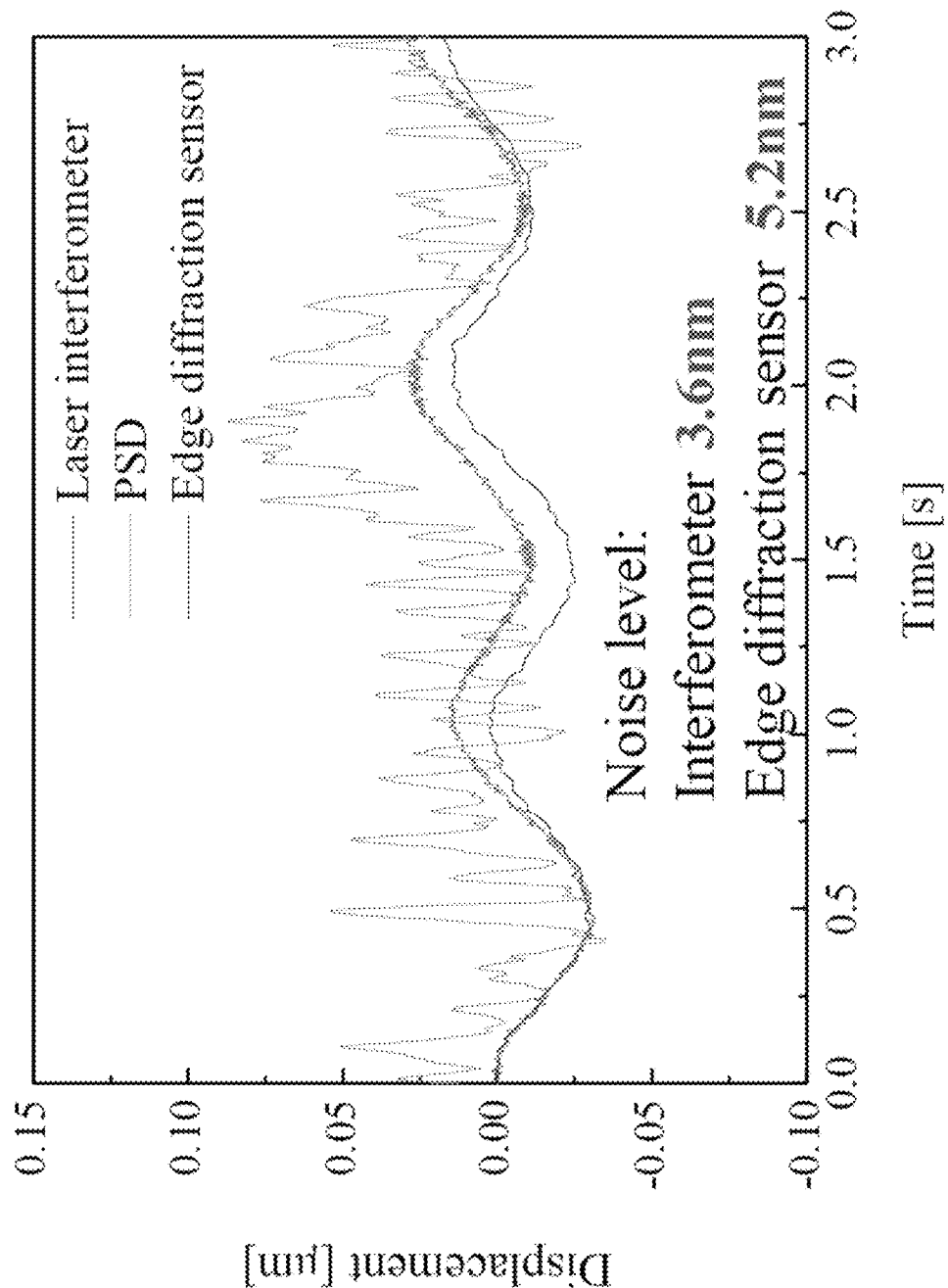
Figure 8:
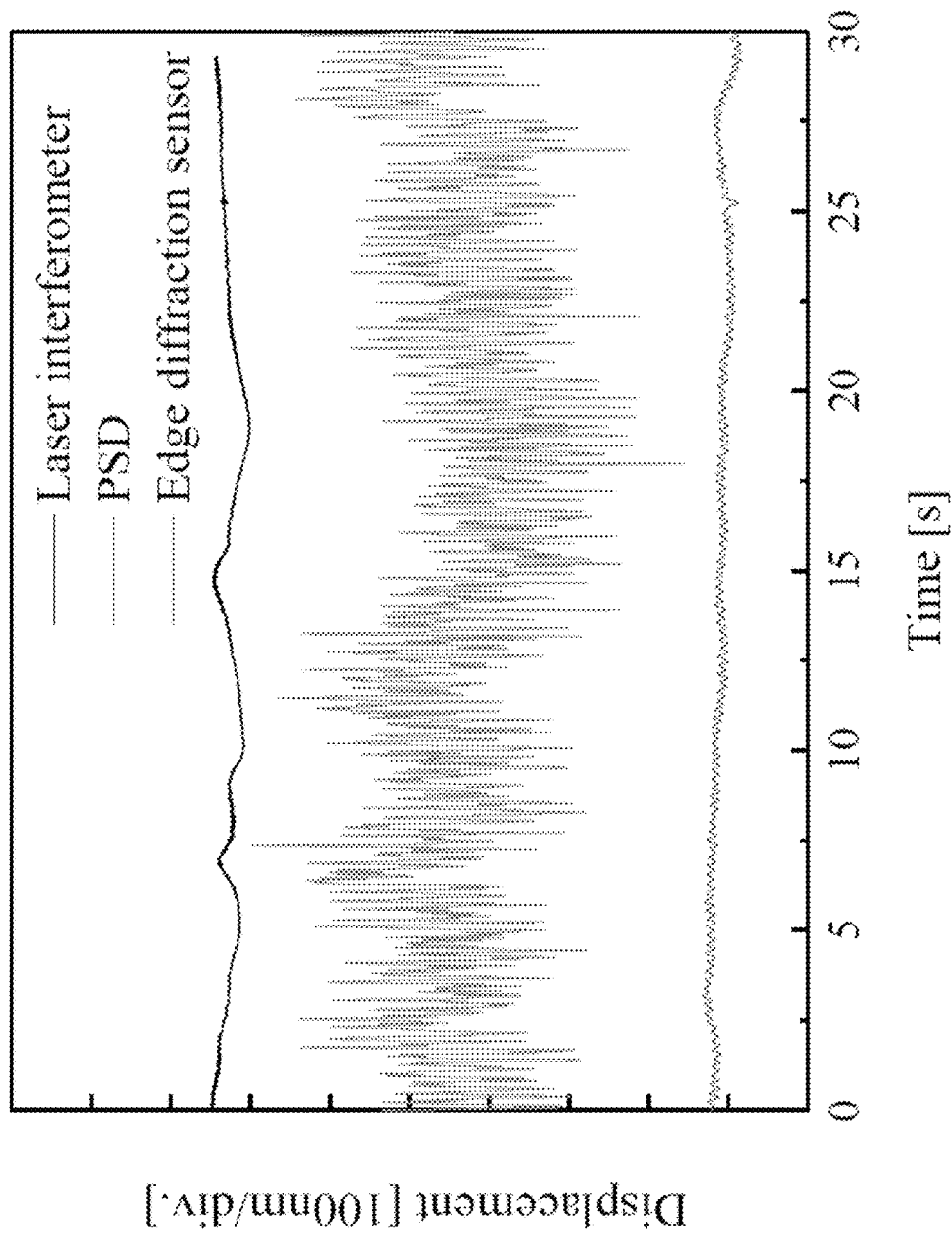
FIG. 8 shows results of sensor stability test: laser interferometer, PSD and edge diffraction sensor according to the Examples.

The proposed sensor was calibrated according to forward and backward directions as shown in FIG. 6. Two directional results were identical and it showed a high linearity within approximately 60 μm range and a high sensitivity 0.167V/μm. Here the linear range and the sensitivity were chosen based on the stroke of the precision stage used in the experiment. It is possible that the measurable range of the sensor becomes shorter or longer by increasing or decreasing its sensitivity according to the stroke of the stage. The displacement information was measured from three displacement sensors, lase interferometer, PSD and edge diffraction sensor, at the same time while the stage was in 1 Hz sinusoidal motion under the stroke conditions: 25 μm, 6 μm, 0.3 μm, 0.03 μm. As seen in FIG. 7, three sensors showed similar results in case of 25 μm and 6 μm stroke conditions, but the signal of PSD showed the fluctuation and the noise level in case of 0.3 μm and 0.03 μm stroke conditions, respectively. However, the edge diffraction sensor showed similar results with that of the laser interferometer with respect to all conditions. In addition, the signals of three sensors were measured for 30 s to test the stability of each sensor while the stage was stationary as seen in FIG. 8. It can be seen that the noise level of PSD is approximately 200 nm. While, the noise level of the proposed edge diffraction sensor was estimated 5.2 nm. The output of the laser interferometer showed the drift because the wavelength tracker was off to make the experiment condition of each sensor equal. As a result, the edge diffraction sensor showed a better stability than two sensors, and it can be thought that the proposed edge diffraction sensor is compatible to the laser interferometer.

Effects of Knife Edge Quality on Edge Diffraction

There exists always an uncertainty associated with the interference information resulted from the edge diffraction due to the surface quality of the knife edge, roughness and sharpness. As the roughness on the knife edge increases and the knife edge becomes dull, the edge diffracted field becomes more incoherent and the interference becomes weaker. It is thus very important to estimate the effects of the quality on the knife edge diffraction of an incident wave in a quantitative way. However, the sharpness and the roughness of the keen knife edge such as a razor blade have not been well-documented and few study of its evaluation method has been performed, so that, it was assumed that those parameters can be united as a new single parameter, knife edge quality.

Figure 9:
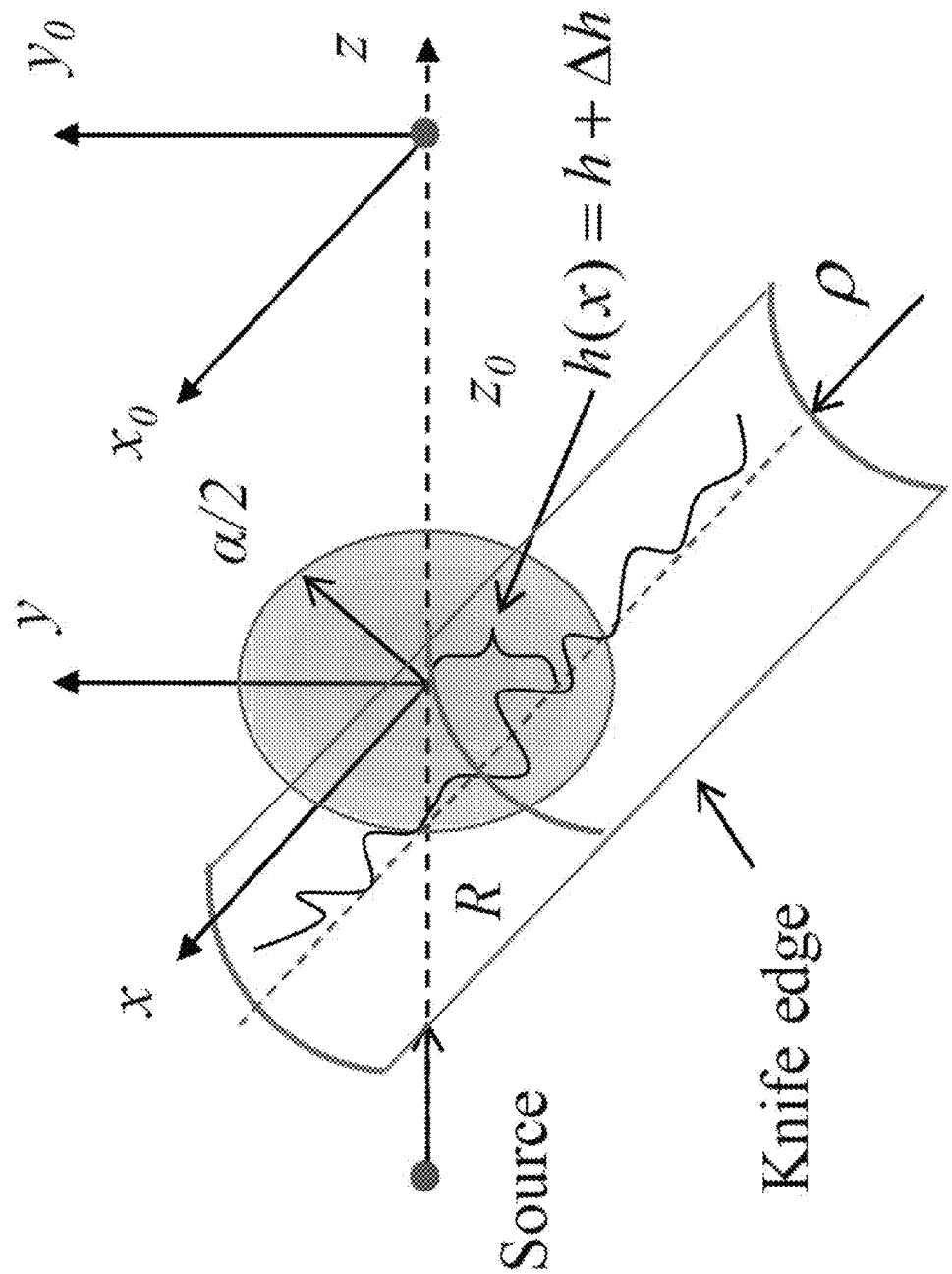
FIG. 9 shows a schematic illustration of the knife edge diffraction in case of the rough and dull edge.

The quality on the knife edge boundary is assumed to comprise Gaussian probability density function (PDF) and considered to be rough and round only along the x direction perpendicular to the transverse direction as illustrated in FIG. 9, where ρ indicates a radius of curvature of the knife edge. The height h can be expressed as a function of its mean height h and its fluctuating part Δh along the x direction. Assumed earlier, the roughness and the sharpness are independent of the x direction and the edge diffraction at the dull knife edge brings about the additional attenuation due to its radius of curvature as well as the roughness. Thus, the fluctuating part can be written in a PDF form with standard deviation σ ($R_{rms}$, ρ) as a function of the roughness and the sharpness by, $$PDF(\Delta h) = \frac{1}{\sqrt{2\pi}\,\sigma} e^{-\frac{\Delta h^2}{2\sigma^2}} \quad (3)$$

The Eq. (3) is substituted for y term in Eq. (2), and The Eq. (2) thus can be rewritten by, $$\langle \vec{E}(0,0,z_0) \rangle = \int_{-\infty}^{\infty} \frac{jk_0 e^{-jk(z_0+R_1)}}{2\pi R_1 z_0} (E_x \vec{x} + E_y \vec{y}) \quad (4)$$

$$\int_{-\infty}^{\infty} \int_{-h_c}^{\infty} e^{-a(x^2+[h-\Delta h]^2)} \frac{1}{2\pi\sigma} e^{-\frac{\Delta h_c^2}{2\sigma^2}} dh dx d\Delta h$$

$$= \frac{jk_0 e^{-jk(z_0+R)}}{2\pi R z_0} (E_x \vec{x} + E_y \vec{y})$$

$$\sqrt{\frac{\pi}{a(2\sigma^2 a+1)}} \int_{-h}^{\infty} e^{-(\sigma/2\sigma^2 a+1)h^2} dh$$

$$= \frac{jk_0 e^{-jk(z_0+R)}}{4\pi R z_0} (E_x \vec{x} + E_y \vec{y}) \mathrm{erfc}\left(-h\sqrt{\frac{a}{2\sigma^2 a+1}}\right).$$

In Eq. (4), the diffracted field becomes equivalent to that of Eq. (2) if the roughness and the sharpness becomes negligible (σ→0).

Figure 10:
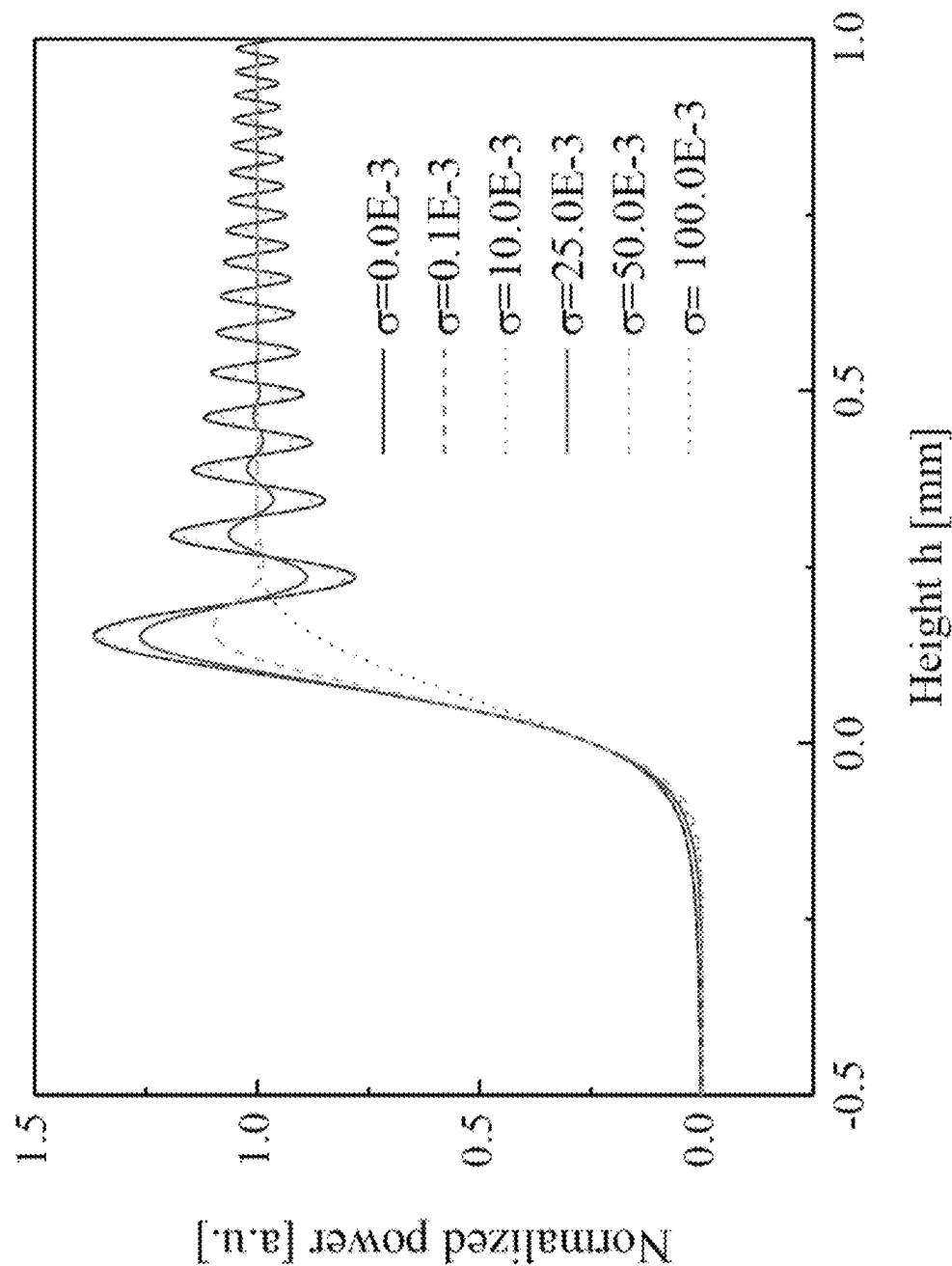
FIG. 10 shows the power curves of the diffracted field calculated with respect to the height under given edge quality parameter conditions according to the Examples.
Figure 11:
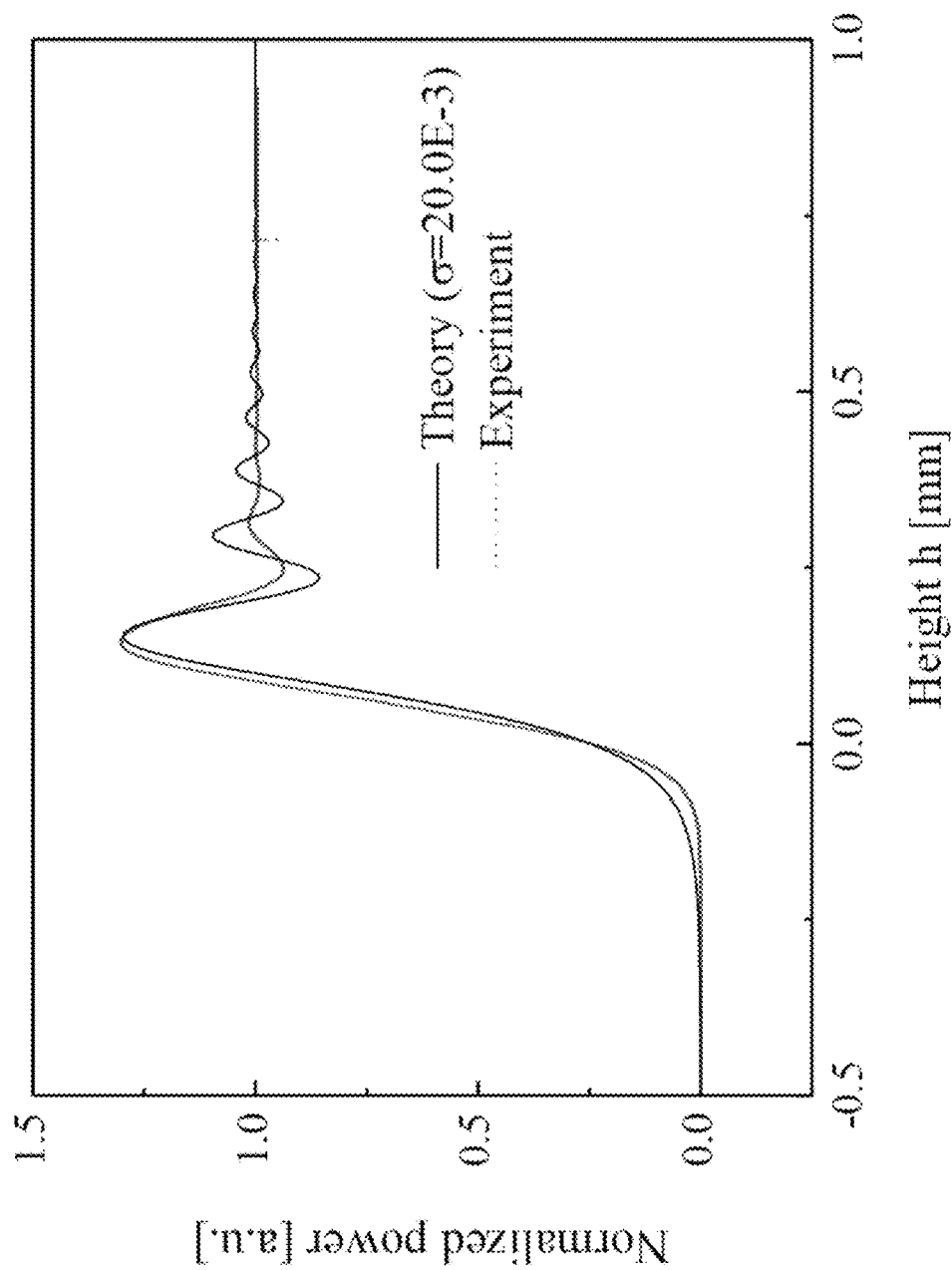
FIG. 11 shows the power curves of the diffracted field calculated (line) and measured (dotted) with respect to the height according to the Examples.

The total power of the diffracted filed at the detector was calculated with respect to the parameter of the knife edge quality σ as shown in FIG. 10. As expected, the interference between the transverse and the diffracted beams at the knife edge became weak as a increased. The analysis result at the condition σ=0.1E-3 was identical to that of the ideal condition that the knifed edge is perfectly sharp and smooth, and the periodic oscillation due to the edge diffraction was not found at the condition σ=100E-3. The diffraction field at the current experiment setup condition was measured to quantity the edge quality used in the experiment. As seen in FIG. 11, the experiment result showed a good agreement with that of theoretical calculation at the condition σ=20E-3 approximately. Lack of the periodic oscillation in the experiment result after the position 0.4 mm was thought as a result of the optical aberration because the theoretical approach is based on paraxial approximation for the phase function. As a result, it was found that high sensitivity for the knife edge-based displacement sensor application can be achieved by using the sharp and smooth knife edge, the high coherent laser with a short wavelength and compact measurement setup.

CONCLUSION

An edge diffraction-based displacement sensor with nanometer accuracy was devised and investigated that can be easily implemented in high precision stage applications for machine tool metrology. The proposed sensor allowed for a simple and non-contact sensing configuration and provided a high resolution. The proposed sensor showed a high linearity within 60 μm range and the resolution 5.2 nm. The electronic bandwidth of the sensor depends on the bandwidth of the photodiode amplifiers, which can easily exceed 1 MHz. As a result, the proposed sensor was compatible to the laser interferometer and two-segmented one-dimensional position sensitive detector. The edge diffraction model suitable for the proposed measurement apparatus was mathematically derived, and it was found that the measuring range and sensitivity are highly dependent on the parameters associated with the edge diffraction, distances from the light source to the knife edge to the detector, wavelength and knife edge quality. Also, high sensitivity for the proposed sensor could be achieved by using the sharp and smooth knife edge, the high coherent laser with a short wavelength and compact measurement setup. This sensing technique is expected to be easily embedded into compact high precision stage applications in a near future.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of determining the position of a substrate, the method comprising:
    attaching a first beam blocking component and a second beam blocking component onto the substrate;
    passing a first light laser beam incident to the first beam blocking component and into a first photodetector, wherein the first beam blocking component intersects the first laser beam to create a blocked portion of the first laser beam and a first diffracted light portion extending past the first beam blocking component and into the first photodetector;
    passing a second light laser beam incident to the second beam blocking component and into a second photodetector, wherein the second beam blocking component intersects the second laser beam to create a blocked portion of the second laser beam and a second diffracted light portion extending past the second beam blocking component and into the second photodetector;
    determining a position of the substrate using signals received by at the first photodetector and the second photodetector; and
    repositioning the substrate based on the position determined.

2. The method of claim 1, wherein determining the position of the substrate using signals received by at the first photodetector and the second photodetector is performed real-time.

3. The method of claim 1, wherein repositioning the substrate based on the position determined is performed real-time.

4. The method of claim 1, wherein determining the position of the substrate using signals received by at the first photodetector and the second photodetector is performed real-time while the substrate is moving.

5. The method of claim 4, wherein repositioning the substrate based on the position determined is performed real-time while the substrate is moving.

6. The method of claim 1, wherein the first beam blocking component intersects the first laser beam to bisect the first laser beam into a first direct transverse portion and the first diffracted portion extending past the first beam blocking component and into the first photodetector.

7. The method of claim 6, wherein the first direct transverse portion and the first diffracted portion are superposed to lead to interference at the first photodetector.

8. The method of claim 7, wherein the second beam blocking component intersects the second laser beam to bisect the first laser beam into a second direct transverse portion and the second diffracted portion extending past the second beam blocking component and into the second photodetector.

9. The method of claim 8, wherein the second direct transverse portion and the second diffracted portion are superposed to lead to interference second photodetector.

10. The method of claim 1, wherein the first beam blocking component is a knife edge or a flange.

11. The method of claim 1, wherein a first beam blocking component defines a knife edge extending in a first direction.

12. The method of claim 11, wherein a second beam blocking component defines a knife edge extending in a second direction.

13. The method of claim 12, wherein a second beam blocking component defines a knife edge extending in a second direction.

14. The method of claim 13, wherein the first direction is 180° from the second direction.

15. The method of claim 14, wherein the first direction is parallel to a direction of travel of the substrate.

16. The method of claim 1, wherein the first beam blocking component is a substrate defining an aperture defining a pinhole or a slit.

17. The method of claim 1, wherein the second beam blocking component is a substrate defining an aperture defining a pinhole or a slit.

* * * * *